United States Patent Office 2,726,157
Patented Dec. 6, 1955

2,726,157

METHOD OF PREPARING SEA CLAMS TO PROVIDE A FRYABLE PRODUCT

Stephen N. Soffron, Rowley, and Peter N. Soffron, George N. Soffron, and Thomas Soffron, Ipswich, Mass.

No Drawing. Application March 18, 1953,
Serial No. 343,226

3 Claims. (Cl. 99—111)

This invention relates to improvements in a clam-product and method of preparing same.

There is a considerable commercial market in supplying clams to be prepared and sold as fried clams. Because of the growing shortage in the smaller clams, efforts have been made to develop a market for larger clams. These larger clams may be described as sea clams, and are also known as surf clams, hen clams, beach clams, dipper and skimmer clams. The technical names for such clams are *Spisula (Mactra) solidissima, solidissima,* or *Spisula (Mactra) solidssima similis* Say. These clams are about four to eight inches in length. The elliptical, smooth, calcareous shells are covered externally with yellowish-brown epidermis, except for the eroded umbones. The interiors of the shells have a smooth, glistening appearance. The soft parts of the clam are typical of lamellibranch molluscs, with the foot, also known as the tongue, being exceptionally well-developed.

It is an object of our invention to prepare certain parts of sea clams by slicing, to provide a product which may be readily used to make a fried clam product.

Sea clams of the type above described have, prior to our invention, been prepared only by grinding into small bits to be used in clam chowder. According to our invention, the sea clams are first blanched by a quick dip in a hot water bath and then opened by hand. The clam is then removed from the skin. The blanching enables the clam to be readily separated from the skin. The clams are washed and the waste removed from the stomachs. The foot of each clam (sometimes called the tongue) is then separated from the body of the clam and the foot parts are then sliced by machine. The thickness of the slice may range from $1/64''$ to $1/4''$. If the slices are too thin, the pieces will not hold together, or if the slices are too thick, there is a lower yield in the final fried clam product. The preferred range of thickness for the slices is $1/8''$ to $1/10''$, as slices of about this thickness, when fried, resemble whole fried clams of the smaller varieties. The slicing must be done by machine to obtain desired slices of uniform thickness.

It is an important step in our invention that the foot of each clam is presented to the slicing machine to be sliced lengthwise of the foot or tongue in order to make long slices. The sliced clam product is then packed and sold to be used in making a fried clam product in the usual manner. The remainder of the clam, which is not sliced, may be ground to be used for chowder.

We claim:

1. The method of preparing sea clams to provide a product suitable for frying, which consists in removing the clam from the shell, separating the foot portion from the body of the clam, and slicing the foot portion lengthwise in slices of substantially uniform thickness throughout the slice.

2. The method of preparing sea clams to provide a product suitable for frying, which consists in removing the clam from the shell, separating the foot portion from the body of the clam, and slicing the foot portion of the clam lengthwise thereof in slices of substantially uniform thickness throughout the slice, the preferred thickness of the slices being in a range between $1/8''$ and $1/10''$.

3. The method of preparing sea clams to provide a product suitable for frying, which consists in removing the clam from the shell, separating the foot portion from the body of the clam, and slicing the foot portion lengthwise thereof in slices of substantially uniform thickness throughout the slice, the thickness of the slices being in a range between $1/16''$ and $1/4''$.

References Cited in the file of this patent

"The Boston Cooking School Cook Book," 1945, by F. M. Farmer, published by Garden City Publishing Company, Incorporated, Garden City, New York, pages 272 and 273.

"Modern Encyclopedia of Cooking," 1949, volume II, by Meta Given, published by J. G. Ferguson and Associates, Chicago, page 1386, article entitled "Boston Clam Chowder."